United States Patent [19]
Millman et al.

[11] Patent Number: 5,243,437
[45] Date of Patent: Sep. 7, 1993

[54] FAX MACHINE HAVING AUTOMATED MAINTENANCE FEATURES

[75] Inventors: Mark E. Millman, Bayville; Raymond A. Sackett, Rumson; Gary N. Weber, Fair Haven, all of N.J.

[73] Assignee: AT&T Bell Laboratories, Murray Hill, N.J.

[21] Appl. No.: 973,245

[22] Filed: Nov. 9, 1992

Related U.S. Application Data

[63] Continuation-in-part of Ser. No. 613,032, Nov. 15, 1990.

[51] Int. Cl.⁵ .......................................... H04M 11/00
[52] U.S. Cl. .................................... 358/406; 358/400
[58] Field of Search ............................. 358/400–407; 379/93, 95, 97, 100

[56] References Cited
U.S. PATENT DOCUMENTS
4,935,955  6/1990  Neudorfer ........................... 379/95
5,127,047  6/1992  Bell et al. ........................... 379/100

Primary Examiner—Stephen Brinich
Attorney, Agent, or Firm—John A. Caccuro

[57] ABSTRACT

A facsimile apparatus provides a user with paper vendor order information when a substantially out-of-paper condition is detected. The facsimile apparatus provides the user with various vendor paper ordering information, including a telephone number, via a display, a printer, or a speaker of the facsimile apparatus. The facsimile apparatus enables the user to manually call or autodial the paper vendor using preprogrammed numbers. The facsimile apparatus enables the user to send to the paper vendor a prestored data or facsimile message, or a fax of a paper order form outputted by the facsimile apparatus and filled-in by the user.

22 Claims, 4 Drawing Sheets

BLACK MARK (NON-RECORDABLE SURFACE)

RED MARKS (RECORDABLE SURFACE)

```
                      PAPER ORDER FORM

NAME:
CO. NAME:
STREET:
CITY:                                                    } 403
STATE:
PHONE NO.:
FAX NO.:

I WOULD LIKE TO ORDER ____ CARTONS OF FAX PAPER FOR MACHINE TYPE XXXX
(6 ROLLS/CARTON) @ $30.00/CARTON

PAYMENT    BILL ME
                                                         } 404
           VISA/MC NO.:_____

FAX FORM TO: JOE'S PAPER
             111 TOOTS ROAD
             MIDDLETOWN, N.J. 07734                      } 401
             1-800-555-1212
```

FAX MACHINE HAVING AUTOMATED MAINTENANCE FEATURES

This application is a continuation-in-part of application Ser. No. 07/613032, filed on Nov. 15, 1990.

TECHNICAL FIELD

The present invention relates to facsimile machine maintenance, and more particularly, to a facsimile machine having an automatic paper ordering capability.

BACKGROUND OF THE INVENTION

Most facsimile (fax) machines today have the capability to warn the user when the end of the paper roll is near or the paper has been exhausted. This warning is done through audible alarms and/or display messages on the fax machine. After the user's paper supply is exhausted (and the user has no additional rolls of paper), the user must decide from where to order more paper. Some prior art fax machines use labels located on the machine to provide instructions for reordering paper. The label instructions may include a telephone number which the user may call to order paper.

Because of aesthetic reasons, or the limited space available, such a label is not usually placed on the control panel or other easily-viewable location on the fax machine, but rather, is placed in the machine (e.g., under a top cover). Additionally, the label may not contain all the information (machine model number, paper type, etc.) needed to enable a user to properly order the paper. Moreover, these labels may be removed or become illegible over time.

As a result the user often resorts to buying any type of fax paper from a local supplier. Undesirably, using other than the recommended fax paper often results in an increased maintenance cost to the user. What is desired is an improved method of enabling the user to reorder fax paper.

SUMMARY OF THE INVENTION

The present invention provides an improved method and apparatus for providing a user of a facsimile (fax) machine with paper reorder information. Our invention recognizes that the display and/or printer of a facsimile machine may be utilized to output fax paper reorder information to the user when an out-of-paper or near out-of-paper (hereinafter, out-of-paper) condition is detected. This information may include a preprogrammed paper vendor's telephone number, address, or other vendor identification information.

According to another feature of the present invention when an out-of-paper condition is detected, an autodialing means is provided to enable the user to dial a system-provided preprogrammed telephone number of the paper vendor. Another feature enables a preprogrammed paper order form to be outputted to the user having locations thereon where various vendor and/or user information may be added manually by the user. Yet another feature enables a completely preprogrammed paper order form to be outputted by the facsimile apparatus. These preprogrammed forms may then be faxed to a preprogrammed facsimile number of a paper vendor.

The pending patent application of J. F. Bell, et al, Ser. No. 482,366, filed on Feb. 20, 1990, and entitled "Facsimile Machine Having User Notification Capability" discloses another facsimile machine having automated user notification features.

The Bell application describes a facsimile machine which detects an out-of-paper condition, dials a preprogrammed number and outputs a prestored message. However, the prestored message outputted by the Bell application is a "trouble" message, i.e., out-of-paper message, which is sent automatically to another location when an out-of-paper condition is detected. In contrast, one feature of the present invention automatically outputs paper reorder information, i.e., a "solution to the out-of-paper problem" locally to the user. Another feature of the present invention outputs an out-of-paper message locally to the user, then requires a user action (to press the send button) before sending a paper reorder message (i.e., a solution to problem message) to a prespecified paper provider. Thus, while the Bell application provides many useful facsimile features, it is directed to notifying the user of facsimile machine problems (e.g., out-of-paper) rather than providing the user with both a notification of the problem and a solution to the problem (e.g., how to reorder paper), as is disclosed and claimed in the present invention.

DETAILED DESCRIPTION

Figure 1:
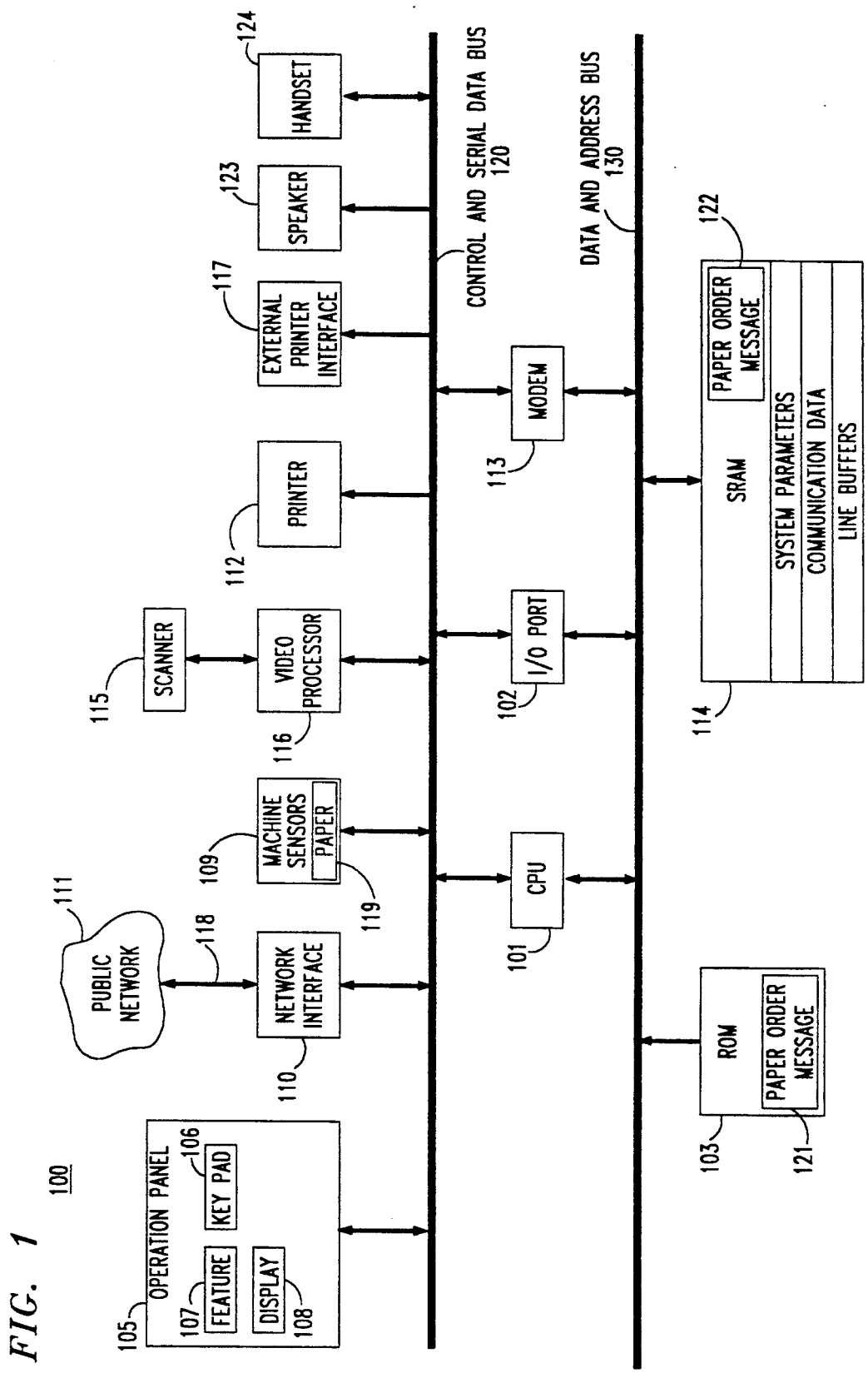
FIG. 1 shows an illustrative block diagram of a facsimile machine useful in describing the present invention.

Shown in FIG. 1 is a block diagram showing the various units of a facsimile (fax) machine 100 useful in describing the present invention. The Central Processing Unit (CPU) 101 operates under program control to control the operations of facsimile machine 100. The CPU 101 controls facsimile machine 100, either directly over control bus and serial data bus 120 or through the I/O Port 102.

CPU 101 controls facsimile machine 100 by communicating in a well-known manner, with operation panel 105, network interface 110, machine sensors 109, video processor 116, printer 112, external printer interface 117 as well as I/O port 102 and modem 113 over control and serial data bus 120.

The Read Only Memory (ROM) 103 contains the system software, or programs utilized by CPU 101 to perform the standard facsimile functions as well as the paper reorder feature of the present invention. The Static Random Access Memory (SRAM) 114 contains memory for storing system parameters and encoded communication data and line buffers for passing unencoded data. As will be described in more detail in a subsequent paragraph, ROM 103 and SRAM 114 may each store the paper order facsimile image file (121 or 122) used in the present invention. The paper order facsimile image file may include a variety of messages stored in text or image form. These messages may include an out-of-paper message, a paper reorder information message for display 108 and a paper order form message for output via printer 112 or external printer, via external printer interface 117. Character data from the file can be translated to text messages composed of characters contained in a font set or character generator. This file is used to generate the various paper order messages used by the present invention. CPU 101 communicates, in a well-known manner, with ROM 103, SRAM 114, and modem 113 via data and address bus 130.

The Operation Panel (OP) 105 contains keypad buttons 106 and one or more feature access buttons 107, such as, illustratively, send, stop, copy, and repertory dial buttons. Activation of these feature buttons and keypad buttons enables the user to enter input commands or requests to CPU 101. The operation panel 105 may include a display 108 to provide output messages to the user typically using a Liquid Crystal Display (LCD). The operation panel 105 may also include one or more Light Emitting Diodes (LEDs) to display various features or machine status. Output messages can also be communicated through audible or voice messages transmitted through a speaker 123 or telephone handset 124.

Machine sensors 109 may include devices (e.g., photointerrupt sensors, reflective photosensors, switches) which may detect the position of the original document, facsimile paper, paper cutter, and facsimile machine covers and which, depending on their state, can indicate error conditions such as original document jam, thermal copy jams, paper cutter jams or cover-open condition. One type of machine sensor 109 is a paper end sensor 119 which is used to detect an out-of-paper (or near-out-of-paper) condition. Other types of paper sensors may be used to detect the paper roll diameter or weight, or the paper height or weight.

Facsimile machine 100 generates a hard copy of received facsimile data, i.e., facsimile messages, using printer 112, in a well-known manner as briefly described hereinafter. The network interface 110 couples facsimile data over one or more facilities connected to a switched network, for example, a public switched telephone network 111. The printer 112, (e.g., a thermal head printer) is used to print facsimile messages or images on a paper medium. These images result from facsimile data which arrives over network 111. In a well-known manner, this facsimile data is coupled through network interface 110, demodulated by the modem 113, passed through the SRAM 114 communication memory, decoded by the CPU 101, stored in the SRAM 114 buffer memory, and sent to printer 112 for printing. An external printer (not shown) can be connected via interface 117 to facsimile machine 100.

Facsimile images are transmitted from facsimile machine 100 in the standard manner. The scanner 115 senses image data from the document to be transmitted and converts it to analog signals. The video processor 116 converts these analog facsimile signals to digital facsimile data. These data are processed through the I/O port 102, where they are passed to CPU 101 via the SRAM 114 buffer memory. The CPU 101 sends the data to modem 113 via the SRAM 114 communication memory. The data is sent from modem 113 through network interface 110 to network 111.

Using the figures and description of this specification as a guide, the operations of the present invention should be integrated into the hardware and program structure of the facsimile machine so as to compatibly cooperate with other features and operations of the facsimile machine. In the following description, the first digit of an element's reference number designates the figure where the element is located (e.g., CPU 101 is located in FIG. 1).

According to the present invention, fax machine 100 includes an automatic paper reorder feature to assist the user in reordering paper for fax machine 100. With reference to FIGS. 1, 2, 3 and 4, we describe the operation of the present invention.

Figures 2, 4:
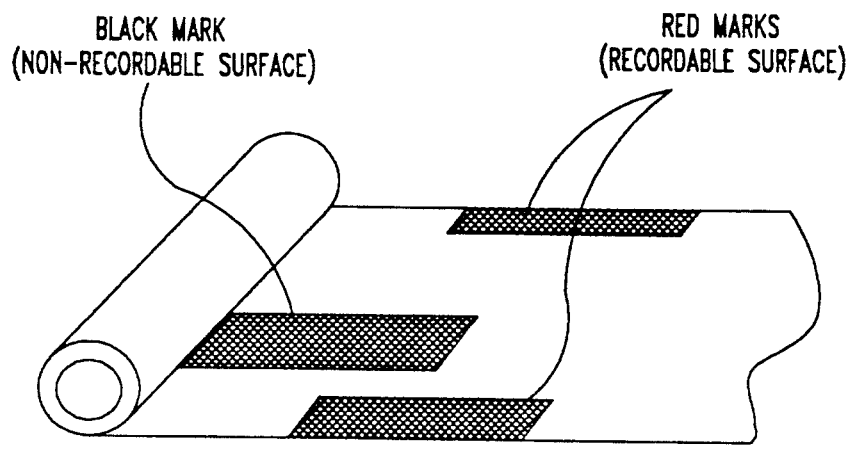
FIG. 2 shows the geometry of a typical roll of thermal paper and the markings which may be used to detect a near out-of-paper condition.
FIG. 4 shows an example of the paper reorder output message which would be generated when the near end detection occurs.
Figure 3:
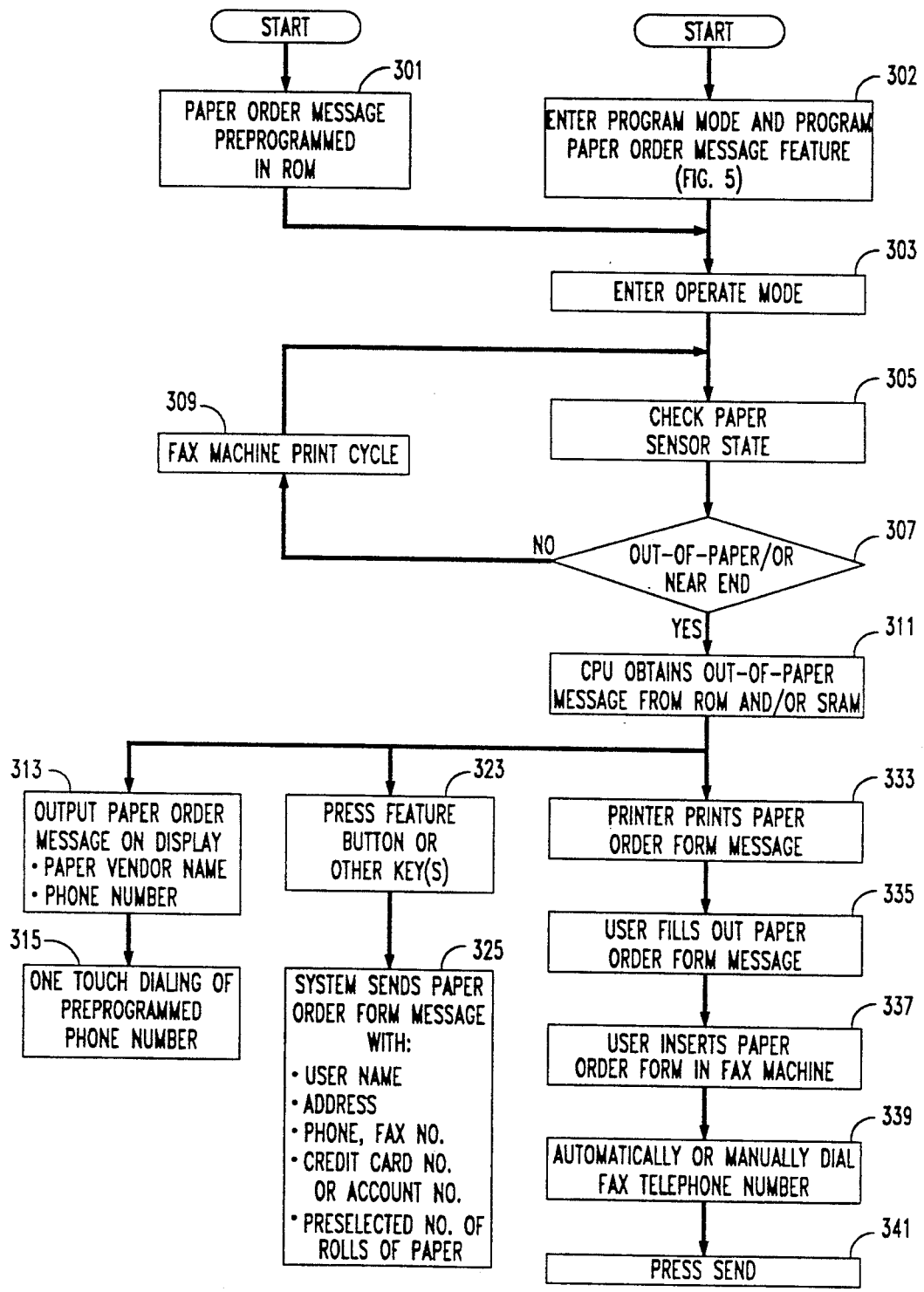
FIG. 3 is a program flow chart describing the operation of the automatic paper reorder message feature of the present invention.

FIG. 3 illustrates a flow chart describing the operation of several embodiments of the present invention. In step 301, a paper order message, including the machine type similar to that shown in FIG. 4, is preprogrammed into ROM 103. During the normal facsimile operate mode, step 303, the facsimile machine 100 periodically checks paper sensor 119, step 305, at start-up, prior to and during a facsimile machine print cycle. If out-of-paper condition is not detected, in step 307, the facsimile machine completes the print operation in step 309. If, however, an out-of-paper condition exists, paper sensor 119 sends a signal to CPU 101 indicating that condition. In response to this condition, in step 311, CPU 101 retrieves the prestored paper order message from ROM 103. In step 313, CPU 101 sends the paper order message to a controller of operation panel 105 for output on display 108. This message may, for example, include information such as a telephone number of a paper vendor to call to reorder paper manually and, optionally, other data such as the name and address of the paper vendor. To avoid limitations due to the size of display 108, a scroll capability for display 108 may be provided by depressing keys 106 on the Operation Panel 105.

In step 315, repertory dialing (e.g., one button dialing) or speed dialing (e.g., two or more button dialing) using a predesignated button or button code, respectively, enables the user to dial the preprogrammed vendor number. The user may then manually order the paper when the paper vendor agent answers the call.

Figure 5:
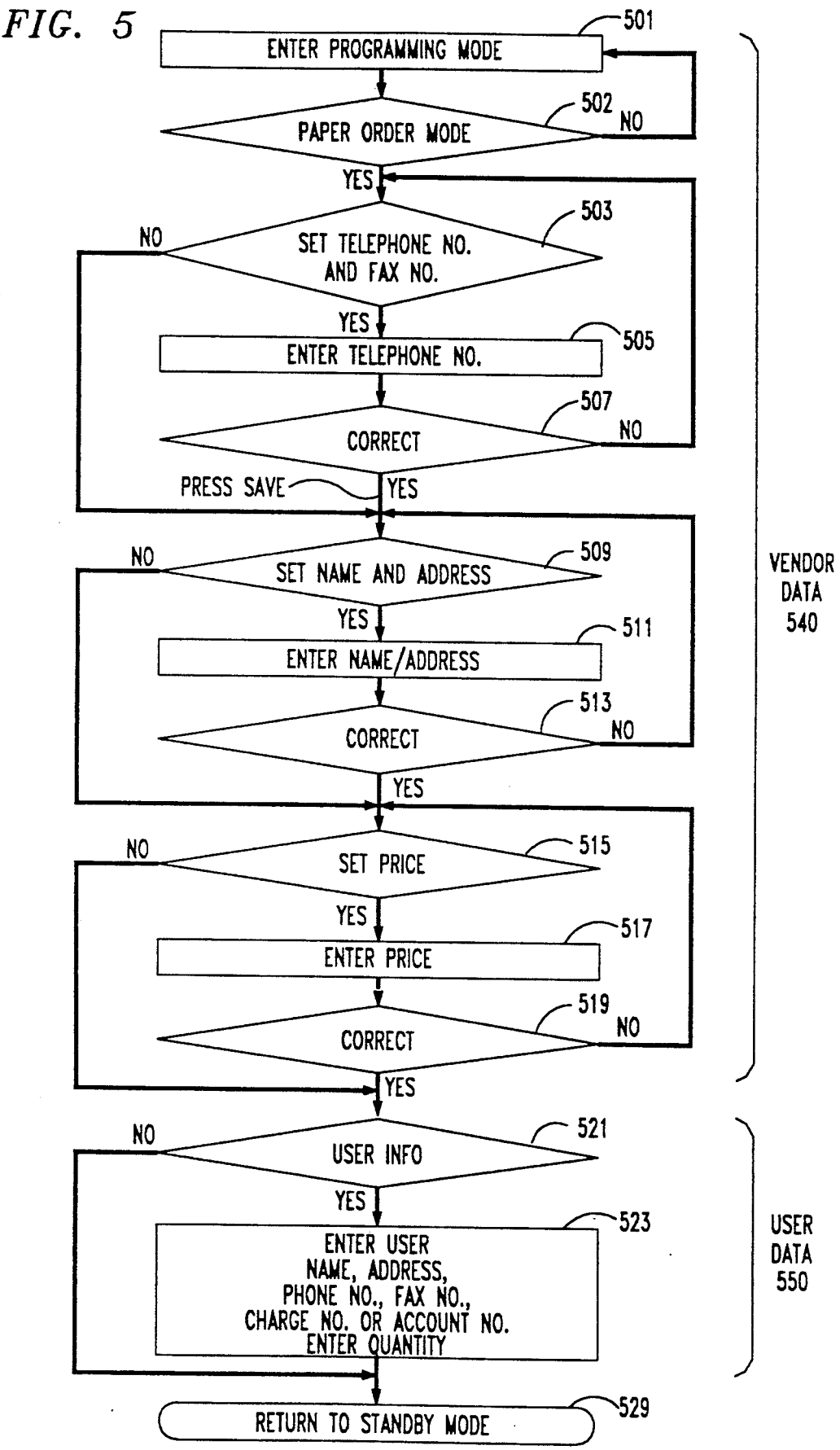
FIG. 5 is a program flow chart, illustratively, describing the programming of custom formats for a paper order message feature.

In another alternative embodiment shown in FIG. 3, in step 302, the user enters the programming mode FIG. 5, receives the paper order form FIG. 4 from ROM 121 and programs the various vendor and user information required for the paper order message. The programming mode shown in FIG. 5 is described in a subsequent paragraph. This user-entered data would be stored in SRAM 114. IN step 311, CPU 101 creates the paper order message using the paper order form from ROM 103 and the user-entered data from SRAM 114. One arrangement would enable the facsimile machine user to change only certain information such as the user data 350 including user name, telephone number, account number, etc., printed on the paper order form of FIG. 4.

In another embodiment, during step 302, the user may program, into SRAM 114, all the information (vendor data 540 and user data 550) required by FIG. 4 including the paper vendor's name, telephone number, facsimile number and the user's name, telephone number, facsimile number, credit card or account number, number of rolls of paper desired, etc.

Following an out-of-paper condition, in step 307, and out-of-paper message step 311, the user may, in step 323, optionally enable the automatic paper reorder feature by pressing an appropriate feature button or key(s).

Following this feature activation, in step 325 the order is sent as a facsimile message directly to the paper vendor's facsimile machine. Alternatively, if the paper vendor's receiving apparatus has the capability to receive digitally-encoded ASCII characters directly, facsimile machine 100 could be arranged to transmit digital characters for output at a printer or storage in a memory at the paper vendor's location.

Note, a subset of the vendor data and user data, described above, may be sufficient in many applications to reorder paper. Also, default vendor data 540 may be programmed in at the factory or by the facsimile machine distributor. This can be remotely programmed by the vendor using modem 113, I/O port 102 and CPU 101 which then stores the data in SRAM 114. Such data can then be, at the user's option, reprogrammed if needed.

In yet, another embodiment, in step 302, the user preprograms vendor data including the vendor name, address and facsimile number (401 of FIG. 4). Then, in step 307, when an out-of-paper condition is detected, CPU 101 causes printer 112, in step 33, to print a paper order form, as shown in FIG. 4. The information on the paper order form of FIG. 4 may have been previously stored in ROM 103 or may have been previously programmed by the user, in which case it would have been stored in SRAM 114 along with the vendor data.

In step 335, the user may then fill out the user data 403, and user billing data 404. Obviously if desired, the user data 403 and/or user billing data 404 could be user preprogrammed and printed out by printer 112. In step 337, the user then inserts the filled-in paper reorder message of FIG. 4 into the facsimile machine 100. In step 339, the user may manually dial, or the facsimile machine 100 may automatically dial the vendor's facsimile number and attempt to send the fax when the user presses the send button in step 341.

With reference to FIG. 5, we describe the user program routine for preprogramming vendor data 540 and optionally user data 550 into SRAM 114. In step 501, the user enters the service mode and selects the paper order feature or mode, in step 502, by activating one or more buttons on the Operation Panel 105. In step 503, the facsimile machine 100 requests the user to enter the vendor's telephone number. Note, all messages (outputted through Display 108, or printer 112) may contain default values for parameters such as phone number to call for paper, price, and the name of the company selling paper. These default values may have been preprogrammed into the machine in the instance where the machine is sold through a dealer or other third party vendor. If any default value is acceptable to the user, the user can bypass having to change such a value (as illustrated by the NO path out of step 503 and subsequent decision steps).

In step 505, if desired, the user enters a telephone number. In step 507, the user verifies if the number is correct or not. In steps 509 through 513 a similar procedure is used to enter the vendor name and/or address or reuse a preprogrammed default name and/or address. In steps 515-519, the user can select and enter the paper quantity and paper price. In step 521, the facsimile machine 100 asks if user data is to be supplied. If not, the facsimile machine 100 returns to the standby mode, in step 529. Otherwise, in step 523, the user can enter various user data including name, address, phone number, facsimile number, charge or account number, etc.

Thereafter, facsimile machine 100 returns to the standby mode.

What has been described is merely illustrative of the application of the principles of the present invention. For example, in an alternate embodiment, the paper order message 121 of ROM 103 may be an audio message which can be outputted to the user via speaker 123 and 124. Thus, other arrangements and methods can be implemented by those skilled in the art without departing from the spirit and scope of the present invention.

We claim:

1. A facsimile apparatus comprising
means for detecting a substantially out-of-paper condition at said facsimile apparatus and
means responsive to said detected out-of-paper condition for outputting paper order information including vendor identification information at said facsimile apparatus.

2. The facsimile apparatus of claim 1 wherein said outputting means is a display means.

3. The facsimile apparatus of claim 2 wherein said display means can be scrolled to display additional paper order information.

4. The facsimile apparatus of claim 2 wherein said display means outputs order information including a preprogrammed telephone number for said user to call to order paper.

5. The facsimile apparatus of claim 4 further including means for autodialing said preprogrammed telephone numbers in response to user activation.

6. The facsimile apparatus of claim 1 wherein said detecting means includes a photo sensor.

7. The facsimile apparatus of claim 1 wherein said outputting means is a printer means.

8. The facsimile apparatus of claim 7 wherein said paper order information is in the form of a paper order form which is outputted via said printer means.

9. The facsimile apparatus of claim 8 wherein said paper order form includes a blank section for the user to write information thereon and which is suitable for transmission via said facsimile apparatus.

10. The facsimile apparatus of claim 9 wherein said facsimile apparatus further includes
means for autodialing a preprogrammed paper vendor's telephone number in response to a user activation of said autodialing means.

11. The facsimile apparatus of claim 1 further including
means for storing preprogrammed paper order information in a form suitable for transmission over a facility connected to said facsimile apparatus and
output means responsive to user activation for enabling said encoded preprogrammed paper order information to be outputted over said connected facility.

12. The facsimile apparatus of claim 1 wherein said outputting means is an audio output means.

13. A method of operating a facsimile apparatus comprising the steps of
detecting a substantially out-of-paper condition at said facsimile apparatus and
in response to said detecting step, outputting paper order information including vendor identification information at said facsimile apparatus.

14. The method of claim 13 wherein said outputting step uses a display means of said facsimile apparatus.

15. A method of claim 14 wherein said output order information includes a telephone number for said user to call to order paper.

16. A facsimile apparatus comprising
means for detecting a substantially out-of-paper condition at said facsimile apparatus and for providing an indication thereof to a user and
means, responsive to a user input made in response to said indication, for establishing a communication connection and sending a paper order request to a prespecified paper provider.

17. The facsimile apparatus of claim 16 wherein said detecting and providing means includes a display means for displaying paper order information as said user indication.

18. The facsimile apparatus of claim 16 wherein said paper order request is sent in facsimile form.

19. A facsimile apparatus comprising
means for detecting a substantially out-of-paper condition at said facsimile apparatus and
printer means responsive to said out-of-paper condition for outputting a paper order information message indicating how a user can order paper for said facsimile apparatus.

20. The facsimile apparatus of claim 19 wherein said paper order information is a paper order form suitable for sending to a prespecified paper vendor using a facsimile transmission.

21. The facsimile apparatus of claim 20 wherein said paper order form includes a portion thereof where a user can write additional information thereon.

22. The facsimile apparatus of claim 20 further including
means for auto-dialing the telephone number of said prespecified paper vendor in response to the user enabling said facsimile transmission of said paper order form.

* * * * *